United States Patent
Ataie (10) Patent No.: US 12,020,573 B2
(45) Date of Patent: Jun. 25, 2024

(54) WIRELESS MAPPING IN REAL-TIME FOR AUTONOMOUS VEHICLES USING CORRELATIVE PASSIVE RECEIVER

(71) Applicant: Raytheon Company, Waltham, MA (US)

(72) Inventor: Vahid Ataie, San Diego, CA (US)

(73) Assignee: Raytheon Company, Tewksbury, MA (US)

( * ) Notice: Subject to any disclaimer, the term of this patent is extended or adjusted under 35 U.S.C. 154(b) by 161 days.

(21) Appl. No.: 17/825,899

(22) Filed: May 26, 2022

(65) Prior Publication Data

US 2022/0392347 A1 Dec. 8, 2022

Related U.S. Application Data (60) Provisional application No. 63/193,519, filed on May 26, 2021.

(51) Int. Cl.
*H04N 5/44* (2011.01)
*G08G 1/16* (2006.01)
*H04W 4/02* (2018.01)
*H04W 4/40* (2018.01)

(52) U.S. Cl.
CPC ............ *G08G 1/166* (2013.01); *H04W 4/027* (2013.01); *H04W 4/40* (2018.02)

(58) Field of Classification Search
CPC ......... G08G 1/166; H04W 4/40; H04W 4/027
See application file for complete search history.

(56) References Cited

U.S. PATENT DOCUMENTS

| | | | | |
|---|---|---|---|---|
| 10,685,504 | B2* | 6/2020 | Mueck | H04W 4/021 |
| 11,232,391 | B1* | 1/2022 | Baalke | G05D 1/0291 |
| 2014/0022128 | A1* | 1/2014 | Smith | G01S 5/0273 |
| | | | | 342/465 |
| 2015/0303989 | A1 | 10/2015 | Mathews et al. | |
| 2017/0168485 | A1 | 6/2017 | Berntorp et al. | |
| 2018/0079423 | A1* | 3/2018 | Weinstein-Raun | B60W 40/04 |
| 2018/0276986 | A1* | 9/2018 | Delp | B60Q 1/507 |
| 2019/0208491 | A1* | 7/2019 | Dzierwa | H04B 17/26 |
| 2022/0232357 | A1* | 7/2022 | Zhang | H04W 4/40 |

OTHER PUBLICATIONS

International Search Report and Written Opinion of the International Searching Authority dated Aug. 19, 2022 in connection with International Patent Application No. PCT/US2022/031118, 10 pages.

* cited by examiner

*Primary Examiner* — Munear T Akki (57) ABSTRACT

Systems and methods for mapping location and characteristics about traffic participants are described. The systems and methods advantageously use correlative receivers for observing wireless emissions from or reflected by a plurality of traffic participants to allow for tracking geolocation and velocimetry information in real-time. The real-time geolocation and velocimetry information can be useful in autonomous vehicle navigation applications and useful for reducing computational burdens associated with tracking locations of many multiple traffic participants using direct sensor measurements, for example.

20 Claims, 8 Drawing Sheets

WIRELESS MAPPING IN REAL-TIME FOR AUTONOMOUS VEHICLES USING CORRELATIVE PASSIVE RECEIVER

CROSS-REFERENCE TO RELATED APPLICATIONS

This application claims the benefit of and priority to U.S. Provisional Application No. 63/193,519, filed May 26, 2021, the contents of which are hereby incorporated by reference in their entirety for all purposes. U.S. Provisional Application No. 63/193,520, filed May 26, 2021, is also hereby incorporated by reference.

The following regular U.S. patent applications (including this one) are being filed concurrently, and the entire disclosure of the other application is incorporated by reference into this application for all purposes:

application Ser. No. 17/825,902 filed May 26, 2022, entitled "WIRELESS MAPPING IN REAL-TIME USING CORRELATIVE PASSIVE RECEIVER;" and application Ser. No. 17/825,899 filed May 26, 2022, entitled "WIRELESS MAPPING IN REAL-TIME FOR AUTONOMOUS VEHICLES USING CORRELATIVE PASSIVE RECEIVER."

BACKGROUND

Techniques for wideband spectral correlation function and/or cyclic-autocorrelation function estimation have been developed. Spectral correlation functions and cyclic-autocorrelation functions can be rich in information, providing statistical insights on received signals. There is a need in the art for improved methods and systems related to use of spectral correlation and cyclic-autocorrelation information.

SUMMARY

Aspects described herein relate to the field of mapping and classification of wireless emitters and reflections of emissions from wireless emitters, with particular application of the disclosed systems and methods to mapping location and characteristics about traffic participants for use by autonomous vehicles by observing the active emissions or emission reflections from traffic participants.

According to an aspect, a method of determining geolocations of traffic participants is provided. The method includes generating a pair of signal inputs by receiving wireless emissions associated with a plurality of traffic participants at a pair of antennas; processing, using a correlative receiver, the pair of signal inputs to determine a set of geolocations and velocimetry information for the plurality of traffic participants. Optionally a method may comprise generating an additional pair of signal inputs by receiving additional wireless emissions associated with the plurality of traffic participants at a pair of antennas; and processing, using the correlative receiver, the additional pair of signal inputs to determine an additional set of geolocations or velocimetry information for the plurality of traffic participants. Optionally, the method may include determining velocimetry information (e.g., velocity vectors) for the plurality of traffic participants based on multiple sets of geolocations for the plurality of traffic participants and a time difference between them. In some examples, the additional pair of signals can be used to determine more precise geolocations and velocimetry information for the plurality of traffic participants, such as by receiving the additional pair of signal inputs using at least one different antenna or at least one antenna that is displaced from the antennas used to receive a prior pair of signal inputs.

The geolocation and velocity information may be provided to and used by an autonomous vehicle, such as to provide information about a traffic environment for awareness and detection of other traffic participants and their velocities and predicted paths. Example traffic participants include, but are not limited to, vehicles (e.g., internal combustion vehicles, electric drive vehicles, bicycles), pedestrians, or the like.

In some examples, a wireless emission associated with a traffic participant comprises a wireless emission generated by a wireless emitter in the traffic participant. For example, such a wireless emitter may be a component of a vehicle, for example, such as a collision transducer, parking emitter, wireless radio transmitter, or the like. In some examples, such a wireless emitter may be a wireless device carried by a vehicle driver or passenger. In some examples, such a wireless emitter may be a wireless device carried by a pedestrian.

In some examples, however, traffic participants may not carry or contain wireless devices generating wireless emissions. In such cases, a wireless emission associated with a traffic participant may comprise a wireless emission reflected by the traffic participant. For example, such wireless emissions may be reflected by a vehicle body. Optionally, the method may further comprise generating a new wireless emission and directing the new wireless emission toward one or more traffic participants, so as to generate reflected emissions which can be then received at the pairs of antennas to allow for geolocation and/or velocity information to be determined for the traffic participants lacking their own wireless devices.

Optionally, the correlative receiver and/or pairs of antennas are positioned in an autonomous vehicle, such as an autonomous vehicle that is a traffic participant. In some cases, the method may comprise providing the sets of geolocations of the plurality of traffic participant and the velocities of the plurality of traffic participants to another autonomous vehicle that is a traffic participants, such as by wireless radio communication.

In some examples, the correlative receiver and/or pairs of antennas are not components of any traffic participant, but instead may be positioned in a location outside of the traffic environment. For example, the method may further comprise providing the sets of geolocations of the plurality of traffic participants and the velocities of the plurality of traffic participants, to an autonomous vehicle that is a traffic participant, such as by wireless radio communication.

It will be appreciated that processing a pair of signal inputs using the correlative receiver can comprise determining a time difference of arrival (TDOA) for a wireless emission received at each antenna of a pair of antennas. As an example, processing a pair of signal inputs using the correlative receiver can comprise determining an angle of arrival (AoA) for a wireless emission received at each antenna of a pair of antennas. Optionally, the process of generating a pair of signal inputs by receiving wireless emissions at a pair of antennas and processing, using the correlative receiver, the pair of signal inputs to determine a set of geolocations of the traffic participant, can allow for simultaneous determination of geolocations of all traffic participants. Optionally, the process of generating a pair of signal inputs by receiving a wireless emission at a pair of antennas and processing, using the correlative receiver, the pair of signal inputs to determine a set of geolocation of the plurality of traffic participants, can be repeated one or more times to allow for tracking geolocation and velocities of the plurality of traffic participants over time.

In some examples, the correlative receiver can use different antennas to receive wireless emissions from the plurality of traffic participants, or the same antennas can be used. In some examples, the correlative receiver can use different antennas to receive wireless emissions from the plurality of traffic participants over time, or the same antennas can be used. A group of three or more antennas can be used, for example, in different pair-wise combinations to provide different pairs of antennas to receive the various wireless emissions. In some cases, a single wireless emission can be received at three or more antennas, which can be paired in different combinations to provide different pairs of signals can be processed by the correlative receiver for providing more precise geolocation information, for example.

Correlative receivers can be useful for processing signal inputs to reduce or eliminate interference from noise, such as from natural sources of radio frequency emission. In some examples, processing a pair of signal inputs using the correlative receiver comprises determining cyclic autocorrelation function or a spectral correlation function of the pair of signal inputs. Optionally, processing the pair of signal inputs using the correlative receiver comprises removing noise using the cyclic autocorrelation function or the spectral correlation function.

Correlative receivers can be useful for determining a class or type of wireless emitter by analyzing a pair of signal inputs. For example, an emission signature can be determined and compared with known emission signatures for different classes or types of wireless emitters, and this information can optionally be paired with the geolocation information for the plurality of traffic participants.

In an aspect, the present disclosure provides methods of determining traffic participant locations and velocimetry information by an autonomous vehicle, such as for use in determining navigational instructions for the autonomous vehicle. In some examples, methods of this aspect comprise obtaining a set of signal inputs corresponding to wireless emissions associated with a plurality of traffic participants received at three or more antennas; processing the set of signal inputs to determine a plurality of cyclic autocorrelation functions or spectral correlation functions for a plurality of pairs of signal inputs of the set of signal inputs using a correlative receiver; determining a set of geolocations and/or velocimetry information for the plurality of traffic participants using the cyclic autocorrelation functions or the spectral correlation functions; and using the set of geolocations and/or velocimetry information by a data processor in an autonomous vehicle to determine navigational instructions for the autonomous vehicle. In some examples, the correlative receiver may be a component of the autonomous vehicle, the autonomous vehicle corresponding to a traffic participant of the plurality of traffic participants, though other examples may employ the correlative receiver remotely from the autonomous vehicle. In examples, a wireless emission associated with a traffic participant may comprise a wireless emission generated by a wireless emitter in the traffic participant, such as a wireless emitter in a vehicle or carried by a pedestrian. Optionally, a wireless emission associated with a traffic participant comprises a wireless emission reflected by the traffic participant.

As described in further detail herein, a correlative receiver can be used to process the signal inputs to obtain information about the emissions. In an example, processing the set of signal inputs comprises processing multiple pairs of signal inputs from different pairs of the three or more antennas, using the correlative receiver, to determine a set of time delays associated with receiving the wireless emissions at the three or more antennas; determining a set of angles of arrival of the wireless emissions at the three or more antennas using the set of time delays; and determining the set of geolocations of the plurality of wireless emitters using the set of angles of arrival. In some examples, methods of this aspect may further comprise analyzing one or more of the cyclic autocorrelation functions or spectral correlation functions to identify a set of classes or types of the plurality of wireless emitters.

In some cases, more precise geolocations are useful or desired by for use by the autonomous vehicle. In such cases, additional signal inputs can be obtained. For example, methods may further comprise repeating the obtaining and the processing one or more times and determining additional or more precise geolocations and velocimetry information for the plurality of traffic participants.

In some cases, traffic participants may not include a wireless emitter, but it may still be desirable and possible to track such traffic participants using the techniques described herein. For example, wireless emissions may be reflected from traffic participants (e.g., off a vehicle body or other component), and these reflected emissions may be used to generate signal inputs. In some examples, a method may further comprise generating a new wireless emission and directing the new wireless emission toward the plurality of traffic participants, wherein the wireless emissions comprises a reflection of the new wireless emission from at least one traffic participant.

In cases where the correlative receiver is remote from the autonomous vehicle, the method may further comprise transmitting the set of geolocations and velocimetry information wirelessly to the autonomous vehicle for use in determining or applying the navigational instructions for the autonomous vehicle. Some methods can be used for sharing geolocation and velocimetry information with other autonomous vehicles, as not all vehicles may include a correlative receiver but may still benefit from the information. In some examples, a method may comprise or further comprise providing the set of geolocations and the velocimetry information to another autonomous vehicle corresponding to a traffic participant of the plurality of traffic participants.

In another aspect, described herein are systems, such as systems determining traffic participant locations and velocimetry information. An example system of this aspect may comprise three or more antennas; a correlative receiver positioned in data communication with the three or more antennas, such as a correlative receiver that is configured to process a set of signal inputs corresponding to wireless emissions associated with a plurality of traffic participants received at the three or more antennas to determine a plurality of cyclic autocorrelation functions or spectral correlation functions for a plurality of pairs of signal inputs of the set of signal inputs; and one or more processors. The one or more processors may be configured to: determine a set of geolocations and/or velocimetry information for the plurality of traffic participants using the cyclic autocorrelation functions or the spectral correlation functions; and use the set of geolocations and/or velocimetry information to determine navigational instructions for an autonomous vehicle. Optionally, the correlative receiver and the one or more processors are components of the autonomous vehicle. Optionally, the correlative receiver and the one or more processors are remote from the autonomous vehicle and the one or more processors may be further configured to transmit the set of geolocations and/or velocimetry information to the autonomous vehicle.

In some examples, the correlative receiver being configured to perform operations may include arranging elements of the correlative receiver in a particular configuration such that various signals are generated and/or processed according to the arrangement of elements. In some examples, the correlative receiver and/or the one or more processors being configured to perform operations may include programming these components with instructions, such as processor executable instructions, which may be optionally stored on one or more non-transitory processor readable storage mediums, that, when executed by a processor cause the processor to perform the operations.

The correlative receiver may optionally be further configured to repeat one or more times obtaining a new set of signal inputs corresponding to wireless emissions associated with the plurality of traffic participants received at the three or more antennas; and processing the new set of signal inputs to determine a plurality of new cyclic autocorrelation functions or spectral correlation functions for a plurality of pairs of signal inputs of the new set of signal inputs using the correlative receiver. The one or more processors may optionally be further configured to: determine additional or more precise geolocations and velocimetry information for the plurality of traffic participants.

In some examples, wherein processing the set of signal inputs comprises processing multiple pairs of signal inputs from different pairs of the three or more antennas, using the correlative receiver, to determine a set of time delays associated with receiving the wireless emissions at the three or more antennas; determining a set of angles of arrival of the wireless emissions at the three or more antennas using the set of time delays; and determining the set of geolocations of the plurality of wireless emitters using the set of angles of arrival. In some examples, the one or more processors are further configured to analyze one or more of the cyclic autocorrelation functions or spectral correlation functions to identify a set of classes or types of the plurality of wireless emitters.

Optionally, a wireless emission associated with a traffic participant comprises a wireless emission generated by a wireless emitter in the traffic participant. Optionally, a traffic participant of the plurality of traffic participants comprises a vehicle or a pedestrian. Optionally, a wireless emission associated with a traffic participant comprises a wireless emission reflected by the traffic participant.

Optionally, the one or more processors are further configured to provide the set of geolocations and the velocimetry information to one or more other autonomous vehicles corresponding to traffic participants of the plurality of traffic participants.

Numerous benefits are achieved by way of the present embodiments and examples described herein over conventional techniques. For example, aspects described provide methods and systems for real-time processing of radiofrequency (RF) input signals that allow passively tracking location and type of transmitter in real-time for use in autonomous driving applications without requiring the ability to decode the contents of the RF input signals. These and other embodiments and examples, along with many of their advantages and features, are described in more detail in conjunction with the text below and attached figures.

BRIEF DESCRIPTION OF THE DRAWINGS

Aspects of the present disclosure now will be described more fully hereinafter with reference to the accompanying drawings, which are intended to be read in conjunction with both this summary, the detailed description, and any exemplary, preferred, and/or particular embodiments specifically discussed or otherwise disclosed. The various aspects may, however, be embodied in many different forms and should not be construed as limited to the embodiments as set forth herein; rather, these embodiments are provided by way of illustration only and so that this disclosure will be thorough, complete, and will fully convey the full scope to those skilled in the art.

DETAILED DESCRIPTION

The electromagnetic (e.g., radio frequency) emissions made by wireless emitters (e.g., cell phones or other radio frequency devices) are generally broadcast by wireless emitters and received by an appropriate base station (e.g., cell tower). Wireless service providers, like cellular service providers, have the ability to receive, decrypt, and decode transmissions made by wireless emitters operating on their networks. This allows wireless providers to obtain a wealth of information about the signals broadcast by the wireless emitters, including access to the data content in the transmissions. In some cases, wireless emitters are able to self-locate, such as by receiving transmissions from global positioning satellites (GPS), and this information can be provided to wireless service providers as data content in transmissions. Wireless service providers can also use multiple base stations to obtain triangulated location information for the emitters in addition to using GPS location information. Without access to the signal content of transmissions or the service provider's network, it can be difficult or impractical to determine location information for a large number of emitters in a condensed geographic area. In general, emitter geolocation requires cooperation by the network operator or the emitter and, in absence of these (when collaborative access to multiple networks and emitters is not viable), it is not possible to map all emitters of interest.

However, since wireless emitters broadcast their transmissions as physical electromagnetic emissions, they can generally be detected by any system with a suitable antenna located within an appropriate detection range, provided that receiver has ability to discriminate noise and interference from the emitter signal. This can be achieved without decrypting or decoding the information content, allowing location information about the wireless emitters to be determined, such as based on a received power and a frequency of the emission. In such a system, when multiple antennas separated by a known distance can used to detect the emissions, further details can be obtained, such as more precise location information (e.g., using triangulation or similar techniques).

Moreover, different types of wireless emitters will emit with different physical characteristics, such as frequency, bandwidth, modulation type or rate, bit rate, etc., and this may also vary based on the wireless service being used or based on the wireless service provider's configuration. For example, using known wireless emitter capabilities, specific information about an individual wireless emitter can be determined by detecting the physical electromagnetic emissions, again without decoding or decrypting the content.

With multiple or millions of wireless emitters distributed throughout a city or other geographic area, a network of antennas could be established to allow tracking of the wireless emitters' locations, but such a network would be comparable to existing base station networks (e.g., cellular networks), requiring infrastructure, equipment, and access to physical locations for installing the antennas, which could be subject to various regulations, franchise requirements, ownership or leasing requirements, or the like, adding to the complexity of such a network and limiting practicability.

According to embodiments described herein, classes of receivers are provided that can overcome such issues, allowing a small set of antennas to be used to track many wireless emitters in a geographic area or in a traffic environment. For example, a correlative receiver can be used. In contrast to a conventional receiver including only a single antenna, a correlative receiver has two inputs for accommodating at least two antennas. This can allow the correlative receiver to determine a time difference for an emission signal received at the two antenna inputs, and a frequency difference of arrival for the emission signal received at the two antenna inputs, which can allow for precise location determination of the wireless emitter. It will be appreciated that the time difference of arrival can be used and the angle of attack of the emission signal incident on the two antenna inputs can be derived from one another, so these aspects may be used interchangeably, in some cases. Further, emission signals received from the two antenna inputs can be correlated to reject noise (e.g., natural noise), to identify and extract generated signals (e.g., man-made or artificial signals, such as generated by wireless emitters) from background emissions, to provide emission characteristics of received signals, or to provide modulation signatures of received signals, such as to aid in emitter classification.

It is possible to use correlative receivers to determine a location and classification of wireless emitters at distances well outside the typical operational range needed for wireless communication. This can be the case since the data in the electromagnetic emission does not need to be recovered by the correlative receiver, effectively reducing the required signal-to-noise ratio, allowing a correlative receiver to be positioned much further away than is needed for a typical base station, which generally establishes a two-way link with wireless emitters and, as a result, is often positioned in reasonable proximity to the wireless emitters. In this way, a single or small set of correlative receivers can be positioned in a geographic area or at the edge of a geographic area and still be useful for tracking location and characteristics of emitters across the geographic area.

Advantageously, the location information can be used by an autonomous vehicle, allowing for reductions in the computational burdens that might otherwise originate from location processing using sensor data (e.g., by ultrasonic ranging, etc.).

In an aspect, real-time correlative receivers, such as for geolocation of traffic participants are described, which can be useful in autonomous driving applications, for examples. In some examples a real-time correlative receiver comprises signal inputs derived from two spatially separated antennas capable of receiving radio-frequency signals in a spectral range greater than 10 MHz; a real-time correlator that operates on two signal inputs in either the time or frequency domain; and a processor that measures or determines one or more of: a time difference of arrival between two signal inputs, an angle of attack of the electromagnetic emission incident on two antenna inputs, and/or a frequency difference of arrival between two signal inputs.

Advantageously, the real-time correlative receivers described herein isolate artificial emissions by rejecting naturally occurring emission noise or interference. Optionally, a real-time correlative receiver may separate moving and stationary emissions, such as for the purpose of identifying user class or emitter class.

In some examples, correlation is initiated or performed by digitizing an input signal and calculating its Fourier transform in order to compute spectral correlation. In some examples, correlation is realized or performed by varying the delay between two signal inputs, multiplying the two, and performing the temporal integration of the product. Optionally, a delay function is realized or performed using a variable length physical waveguide. Optionally, a delay function is realized or performed using a combination of a tunable oscillator and a dispersive waveguide. Optionally, a multiplication function is realized or performed by an optical or radio-frequency mixer element. Optionally, a multiplication function is realized or performed by a coherent optical detector.

Various outputs of a real-time correlative receiver can be used. In some examples, the output is a spectral correlation function (SCF) or a cyclical autocorrelation function (CAF). Optionally, a real-time correlative receiver can generate SCF and CAF output for the purpose of determining geolocation of the emitter and its velocimetry. Optionally, a real-time correlative receiver can generate SCF and CAF output for the purpose of identifying the type of service the emitter is using. Optionally, a real-time correlative receiver can generate SCF and CAF output for the purpose of identifying the physical parameters of the emitter. Without limitation, example physical parameters may include one or more of: emission frequency and operating band, modulation cycle, coding type used to modulate the emission, spectral and temporal response of the transmitter generating the emission, hardware type comprising the specific emitter, or directivity of the emission.

Real-time correlative receivers can operate over a variety of radio frequencies. In some examples, the operating range is from 10 kHz to 4 GHz. In some examples, the operating range is from 10 kHz to 30 GHz. In some examples, the operating range is from 10 kHz to 110 GHz. Optionally, a real-time correlative receiver can have or provide a geolocation accuracy of 2 feet or better, such as for an emission that ranges from 10 feet to 100 feet away. Optionally, a real-time correlative receiver can have or provide a geolocation accuracy of 2 feet or better, such as for an emission that ranges from 100 feet to 1000 feet away.

In some examples, a real-time correlative receiver can share its output with a different, spatially distinct a real-time correlative receiver, such as in a remote vehicle or traffic participant. Optionally, two signal inputs are realized by accessing a different pairs of spatially separated antennas. In some cases, a real-time correlative receiver comprises or is equipped with more than two antennas. Optionally, a real-time correlative receiver may comprise or have access to a plurality of antennas in a pairwise manner, using the two inputs.

The geolocation data obtained by a real-time correlative receiver can be used in a variety of applications. For example, the geolocation can correspond to geolocation of emissions associated with a vehicle carrying at least one wireless emitter (e.g., a wireless communication device). In some examples, the emissions and/or the geolocation can be associated with an internal combustion engine vehicle or an electric engine vehicle. Optionally, the emissions and/or the geolocation can be associated with a traffic participant lacking engine propulsion, such as a pedestrian or bicycle. Optionally, the emissions can be reflected emissions, such as reflected from a traffic participant, such as a vehicle or pedestrian. Optionally, the emissions can originate from a vehicle's ranging or anti-collision transmitter and/or such emissions from a vehicle's ranging or anti-collision transmitter can be reflected by another traffic participant.

Optionally, a real-time correlative receiver can compute velocimetry information for the emitters, such as by monitoring or tracking the geolocation as a function of time. The velocimetry information can optionally be determined for a plurality or all emissions identified or detected.

Correlative receivers can be used to allow location information for wireless emitters to be determined and can allow for determination of emitter characteristics, all based on simply detecting the existence of the wireless emissions and without decoding or decrypting data in the wireless emissions. Since the presence of the wireless emissions can be detected at ranges much greater than needed for decoding or decrypting the data, the signal-to-noise ratio can be much smaller than needed for wireless communications, allowing the useful range for correlative receivers to be considerably larger than for wireless communications. Correlative receivers also allow for improved rejection of noise, such as background or natural radio frequency noise, because the correlative receiver can operate using pair-wise coupling of signals from multiple antenna inputs.

A variety of different correlative receivers can be used, such as a cyclostationary receiver. Such receivers, when used for real-time detection of radio frequency emissions may be limited, however, to the GHz-scale frequency range, or lower, when a conventional (all-electronic implementation) is used. Hybrid correlative receivers, combining analog and digital processing are useful for scaling the useful frequency range to tens of GHz, while still operating in real-time, providing for extension into frequencies with shorter nominal propagation ranges. Additional details about spectral correlation and analysis may be found in U.S. patent application Ser. No. 16/236,038, filed on Dec. 28, 2018, and published under publication no. US 2019/0339548 on Nov. 7, 2019, now U.S. Pat. No. 11,137,627, which is hereby incorporated by reference.

Correlative Receiver System

Time modulated signals, x(t), can be analyzed using spectral correlation, such as to determine characteristics about the signals themselves, without evaluating the data content in the signals. Spectral correlation has been used in signal detection, for example in telecommunications systems. The spectral correlation function of a cyclostationary process describes the cross-spectral density, or coherence, of all pairs of frequency-shifted versions of a time-series. Calculation of the spectral correlation causes the stochastic portion (i.e., noise) of the cyclostationary process to vanish while the deterministic portion having cyclic features emerges.

Cyclostationary and high-order (cumulant) analysis is based on a fact that signals and noise have different correlation (i.e., moment) properties. A modulation-bearing signal, x(t), such as a wireless emission, possesses a unique cyclic autocorrelation, $R_x^\alpha(\tau)$, defined as the Fourier transform of a signal and its delayed copy as shown in equation (1):

$$R_x^\alpha(\tau) = \int_{-\infty}^{\infty} x\left(t - \frac{\tau}{2}\right) x^*\left(t + \frac{\tau}{2}\right) e^{-j2\pi\alpha t} dt. \quad (1)$$

One of skill in the art will recognize equation (1) as a Wigner function that approximates how the spectral density changes in time. The spectral correlation function, $S_x^\alpha(f)$, is the Fourier counterpart of the cyclic autocorrelation, $R_x^\alpha(\tau)$, as shown in equation (2):

$$S_x^\alpha(f) = \int_{-\infty}^{\infty} R_x^\alpha(\tau) e^{-j2\pi f \tau} d\tau \quad (2).$$

Techniques for determining the cyclic autocorrelation function, $R_x^\alpha(\tau)$, and/or spectral correlation function, $S_x^\alpha(f)$, of a modulated signal are described as in U.S. patent application Ser. No. 16/236,038, filed on Dec. 28, 2018, and published under publication no. US 2019/0339548 on Nov. 7, 2019, now U.S. Pat. No. 11,137,627, which is hereby incorporated by reference. It will be appreciated that if one of a cyclic autocorrelation function $R_x^\alpha(\tau)$ or a spectral correlation function, $S_x^\alpha(f)$, is available or determined, the other can be obtained directly as they are related to one another by Fourier transform, as described above.

Obtaining a cyclic autocorrelation function and/or spectral correlation function of wireless emissions can allow for determination of characteristics information about the emission, such as a carrier frequency, bandwidth, bit rate, modulation type. For use in determining geolocation information about an emitter, multiple spatially separated antennas can be used in a variation of cyclic autocorrelation, referred to herein as cyclic cross-correlation. When two antennas are separated from one another by a distance, they can both receive the same wireless emission, but there will be a time delay, $t_D$, between the received signals, which will be a function of the distance between the antennas. Instead of determining the correlation of a received signal x(t) with itself (autocorrelation), the signals received at two different antennas ($x_1(t)$ and $x_2(t)$) can be correlated with one another:

$$R_{x_1 x_2}^\alpha(\tau) = \int_{-\infty}^{\infty} x_1\left(t - \frac{\tau}{2}\right) x_2^*\left(t + \frac{\tau}{2}\right) e^{-j2\pi\alpha t} dt. \quad (3)$$

Figure 1:
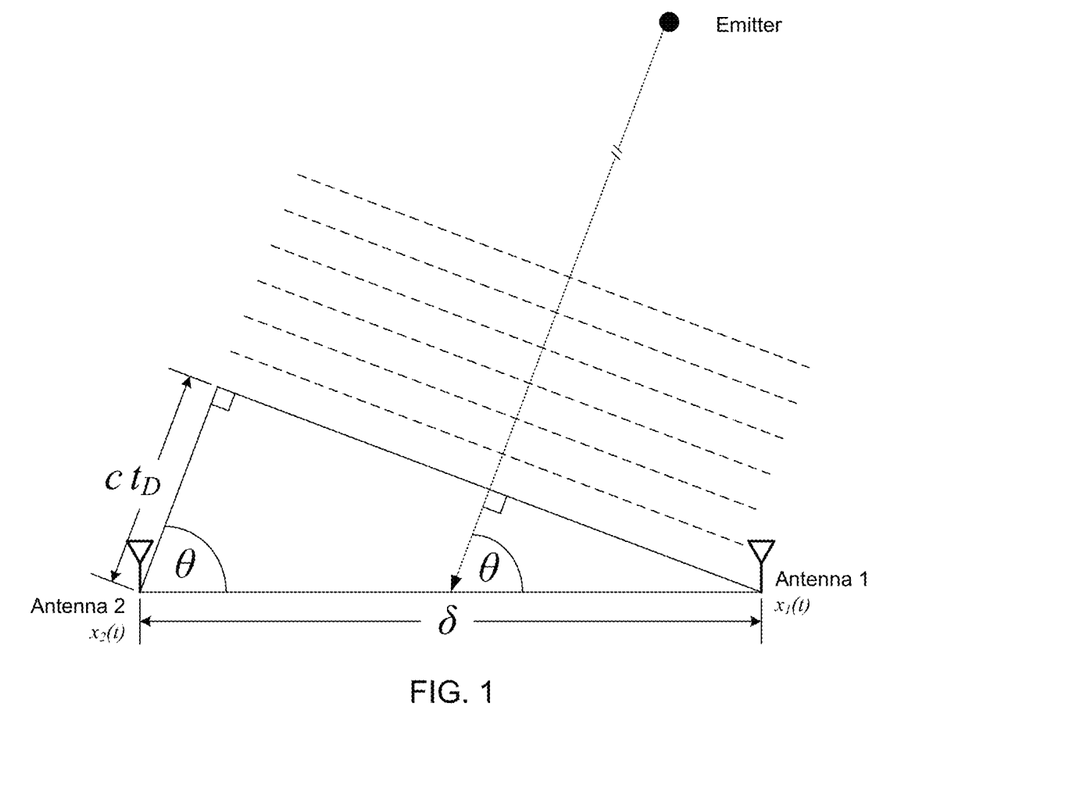
FIG. 1 is a schematic illustration showing receipt of a wireless emission at two different antennas and an angle of arrival of the wireless emission.

Values of $\tau$ for cyclic cross-correlation will be shifted by the time delay, $t_D$, between receiving the signals at the different antennas. Maxima-finding algorithms can quickly estimate $t_D$ and the angle of arrival (AoA) for the signals with respect to a line between the antennas. FIG. 1 shows an overview of the geometry of two antennas with respect to an emitter, showing the distance between them $\delta$ and the angle of arrival, $\theta$, where a cosine function defines the relationship between $\theta$, $\delta$, and $t_D$:

$$\cos\theta = \frac{ct_D}{\delta}. \quad (4)$$

Figure 2:
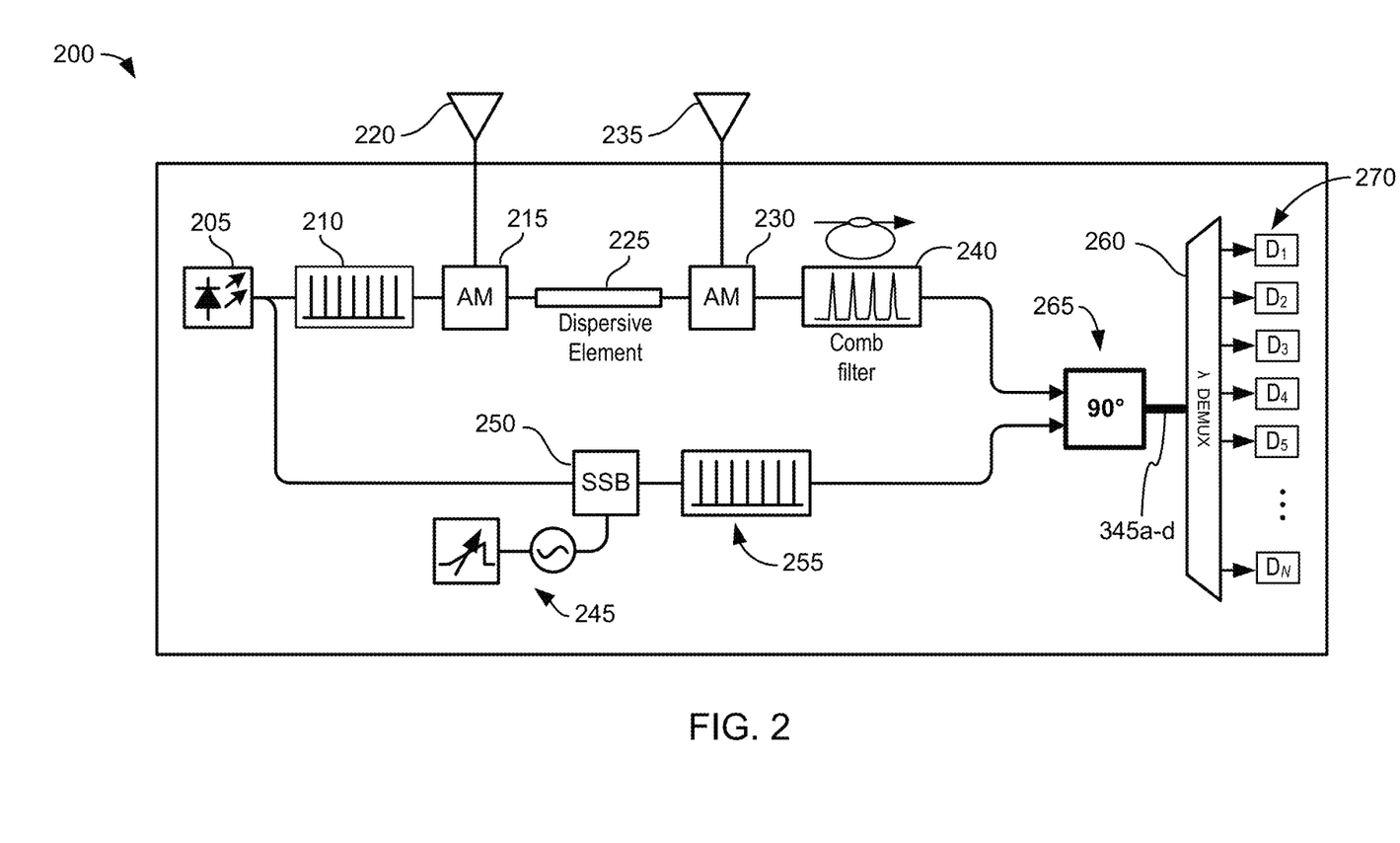
FIG. 2 provides a schematic illustration of an example correlative receiver system in accordance with some examples of the present disclosure.

FIG. 2 is a block diagram of a correlation system 200, useful for determining cyclic autocorrelations, cyclic cross-correlations, and/or spectral correlation functions. The correlation system 200 may provide means to solve the Wigner equation (i.e., equation (1)) and variations thereof in the optical domain without performing the repetitive calculations typically required to obtain a solution. Referring to FIG. 2, the correlation system 200 may include a master laser 205, a first optical modulator 215, a dispersive element 225, a second optical modulator 230, and an optical comb filter 240. The master laser 205 may be, for example, but not limited to, a low-linewidth semiconductor laser or other laser. The master laser 205 may generate a self-referenced optical frequency comb 210 of signals at different optical wavelengths (i.e., colors, or tones). The tones of the optical frequency comb signal 210 may be modulated at the first optical modulator 215 by a first input signal $x_1(t)$ corresponding to a radio frequency (RF) signal received at first antenna 220. The first optical modulator 215 may generate N spectral copies of the first input signal $x_1(t)$ on the tones of the optical frequency comb signal 210.

The N spectral copies of the first input signal $x_1(t)$ may be sent to the dispersive element 225. The dispersive element 225 may be an optical fiber dispersive element, for example, but not limited to, a single mode fiber or other dispersive element. The dispersive element 225 may generate wavelength-dependent time delays, $\tau_k$, between adjacent spectral copies of the first input signal $x_1(t)$. The time delays correspond to phase shifts in the frequency domain. The delayed spectral copies (i.e., $x_1(t-\tau_1) \ldots x_1(t-\tau_N)$) of the first input signal $x_1(t)$ may be sent to the second optical modulator 230.

The second optical modulator 230 may modulate the delayed spectral copies of the first input signal $x_1(t)$ with a conjugate $x^*_2(t)$ of a second input signal $x_2(t)$ corresponding to a radio frequency (RF) signal received at second antenna 235, which may comprise a time-delayed version of the first input signal $x_1(t)$. The second optical modulator 230 may generate conjugate modulated spectral copies (i.e., $x_2^*(t)x_1(t-\tau_1) \ldots x_2^*(t)x_1(t-\tau_N)$) of the delayed spectral copies. The conjugate modulation of the delayed spectral copies of the input signal $x_1(t)$ results in the practical generation of the terms $$x_1\left(t-\frac{\tau}{2}\right)x_2^*\left(t+\frac{\tau}{2}\right)$$

from equation (3) that are integrated to obtain the cyclic autocorrelation or cross-correlation coefficients.

The conjugate modulated spectral copies may be sent to the optical comb filter 240. The optical comb filter 240 may be, for example, but not limited to, a fine resolution etalon or other optical comb filter. The optical comb filter 240 may perform the integration of the conjugate modulated spectral copies to produce integrated conjugate modulated spectral copies corresponding to the cyclic autocorrelation coefficients for all time delays $\tau_k$. For example, the N-th integrated conjugate modulated spectral copy may have a complete set of cyclic autocorrelation coefficients $R_{x_1x_2}^{\alpha_i}(\tau_N)$ corresponding to $\tau_N$ delay at each cyclic frequency $\alpha_i$, where i=1, 2, . . . N. Consequently, a full complement of N integrated spectral copies will form a complete cyclic autocorrelation table, eliminating a need for full-rate FFT computations in either photonic or electronic domains.

Correlation system 200 illustrated in FIG. 2 further includes components for readout of the cyclic autocorrelation coefficients. For example, correlation system 200 may include a radio frequency (RF) oscillator 245, a third optical modulator 250, for example, a single side band (SSB) modulator or other modulator, an optical wavelength demultiplexer 260, a 90° hybrid optical module 265, and a plurality of detectors $D_1$-$D_N$ 270. The plurality of detectors $D_1$-$D_N$ 270 may be coherent receivers. The RF oscillator 245 may generate a swept frequency. The signal generated by the master laser 205 and the swept frequency generated by the RF oscillator 245 may be input to the third optical modulator 250.

The third optical modulator 250 may shift the signal generated by the master laser 205 in frequency, for example, by several gigahertz or another amount, this frequency shifted signal may be used to generate the second optical frequency comb 255. The second optical frequency comb 255 may have the same frequency pitch as the original frequency comb 210 used to spectrally clone the input signal $x_1(t)$; however, the comb teeth of the second optical frequency comb 255 may be sweeping by several gigahertz following the swept RF oscillation 245. The generated frequency comb may be referred to herein as swept optical sampling signals. The swept optical sampling signals may sweep at a lower rate than the frequency of the master laser signal, for example, a frequency of approximately 25 kHz or another frequency.

The swept optical sampling signals and the integrated conjugate modulated spectral copies may be combined by the 90° hybrid optical module 265. The 90° hybrid optical module 265 may act as a coherent receiver and output four signals: a modulated signal plus local oscillator signal, a modulated signal minus local oscillator signal, a modulated signal plus conjugate of local oscillator signal, and a modulated signal minus conjugate of local oscillator signal. The output signals of the hybrid optical module 265 may be input to the optical wavelength demultiplexer 260.

The optical wavelength demultiplexer 260 may include a plurality of demultiplexer modules. In some implementations, four demultiplexer modules may be used. Each demultiplexer module may be configured to demultiplex one output of the hybrid optical module 265. The demultiplexed signals may be detected by the plurality of detectors 270. The plurality of detectors $D_1$-$D_N$ 270 may be coherent detectors. In some embodiments, each coherent detector may include two balanced detectors, with each balanced detector having two PIN diodes (i.e., a total of four PIN diodes for each coherent detector). Each of the plurality of detectors $D_1$-$D_N$ 270 receives a signal from each of the plurality of demultiplexer modules. For example, for implementations using four demultiplexer modules, each detector $D_1$-$D_N$ receives a signal from each demultiplexer module, i.e., each detector $D_1$-$D_N$ receives four signals.

Each of the detectors $D_1$-$D_N$ may coherently detect cyclic autocorrelation (cross-correlation) coefficients for all time delays $\tau_k$ of an associated tone from the integrated conjugate modulated spectral copies. The detectors $D_1$-$D_N$ may simultaneously stream the coefficients such that the $R_{x_1x_2}^{\alpha_1}(\tau_1)$, $R_{x_1x_2}^{\alpha_1}(\tau_2), \ldots R_{x_1x_2}^{\alpha_1}(\tau_1)(\tau_N)$ coefficients are detected at the same time, the $R_{x_1x_2}^{\alpha_2}(\tau_1)$, $R_{x_1x_2}^{\alpha_2}(\tau_2), \ldots R_{x_1x_2}^{\alpha_2}(\tau_N)$ are streamed simultaneously after the $R_{x_1x_2}^{\alpha_1}(\tau_1)$, $R_{x_1x_2}^{\alpha_1}(\tau_2)$, ... $R_{x_1x_2}^{\alpha_1}(\tau_N)$ coefficients, etc. The detectors $D_1$-$D_N$ may output the detected cyclic autocorrelation coefficients as a function of time. Thus, correlation system 200 can provide for efficiently determining the cyclic autocorrelation or cross-correlation coefficients. The detected coefficients may be digitized, for example using an analog-to digital (A/D) converter, and the spectral correlation function calculated.

Correlation system 200 can include other components beyond those illustrated in FIG. 2, such as processors, input or output devices, control devices, memory devices, storage devices, or the like. It will be appreciated that correlation system 200 merely provides one example of a correlative receiver and that other implementations may be used instead. For example, certain aspects of correlation system 200 can be implemented using digital system components. For example, all-electronic implementations of correlative receivers can be used, as well as hybrid correlative receivers that combine analog and digital signal processing cores. In some examples, when analog signals from the antennas are measured as a function of time, these analog signals can be quantized using one or more analog to digital converters. To obtain the frequency spectrum of the signal received at the antenna, a fast Fourier transform (FFT) can be performed on the digital data.

Figure 3:
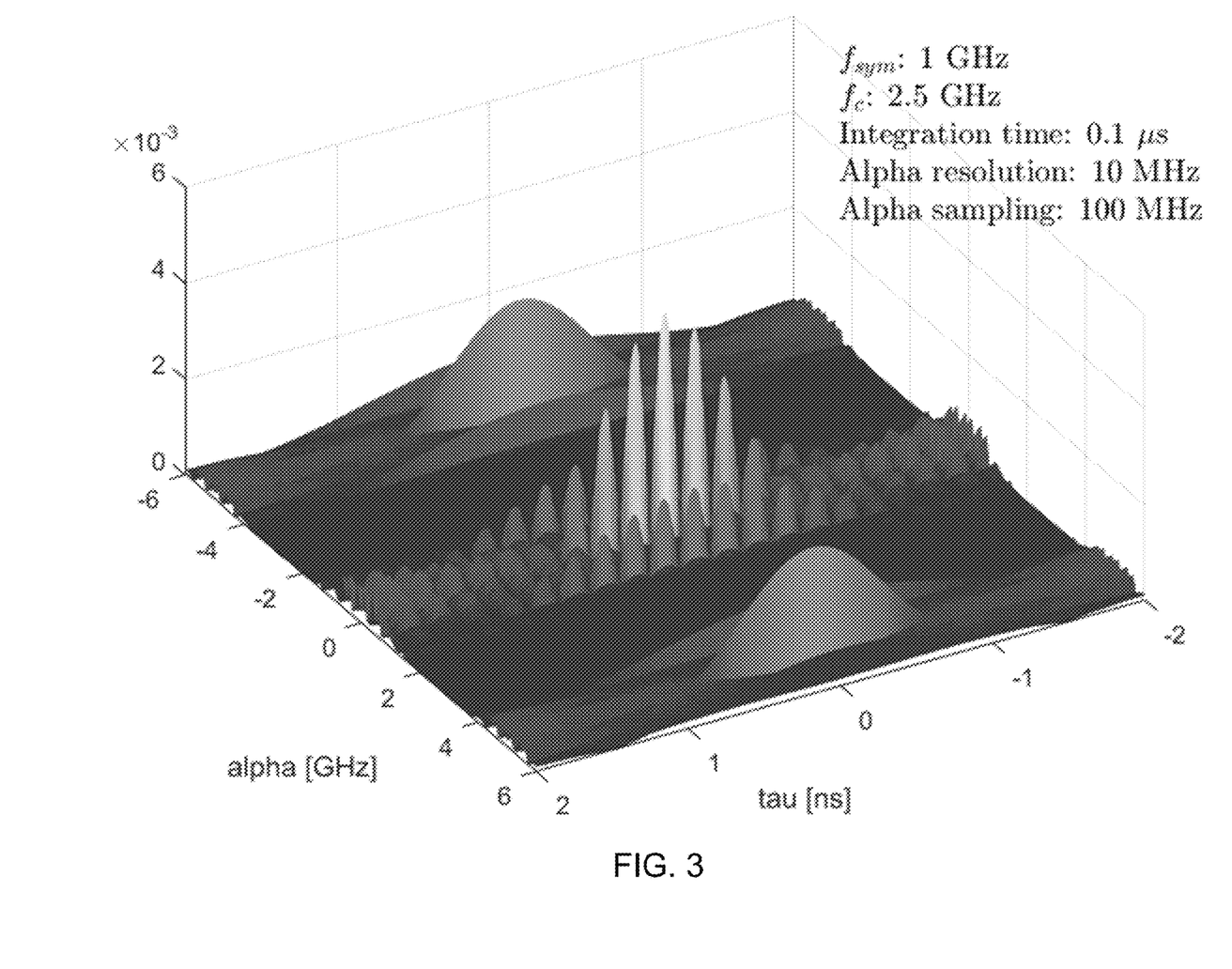
FIG. 3 provides a 3-dimensional plot illustrating an example cyclic autocorrelation function.
Figure 4:
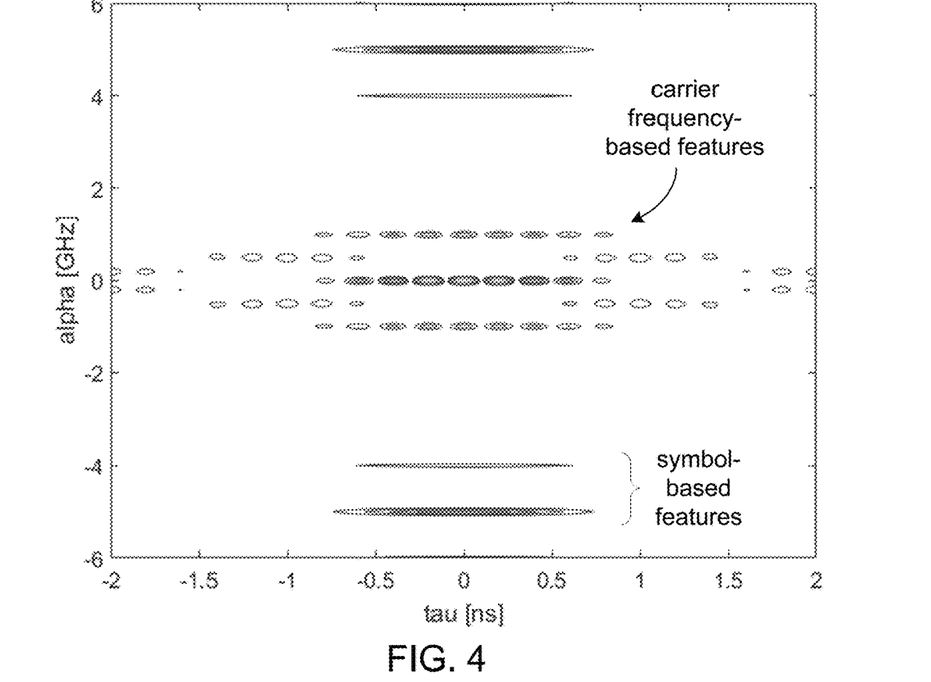
FIG. 4 provides a 2-dimensional plot illustrating an example cyclic autocorrelation function.
Figure 5:
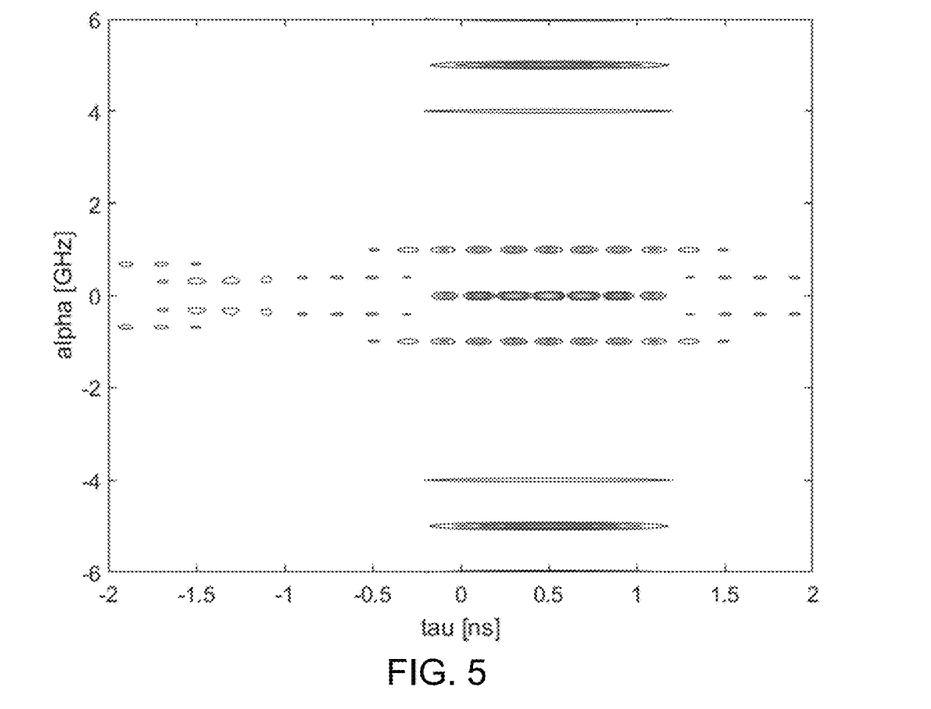
FIG. 5 provides a 2-dimensional plot illustrating another example cyclic autocorrelation function for a time-delayed signal.

FIG. 3, FIG. 4, and FIG. 5 shows cyclic autocorrelation function plots for a 1 GHz symbol rate BPSK signal with a root-raised cosine filter, for antennas spaced 1 m apart, showing both symbol-based features and carrier frequency-based features. In FIG. 3, the plot shows the data as a 3-dimensional plot and the FIG. 4 shows the same data as a 2-dimensional plot. In FIG. 5, symbol-based features are centered around τ=0 ns, indicating that a delay time, $t_D$, between the signals received at the two antennas is about 0 ns. In FIG. 5, the symbol-based features are shifted to the right, and centered around τ=0.5 ns, indicating that the delay time, $t_D$, between the signals received at the two antennas is about 0.5 ns. Based on this information and using equation 4, above, the angle of arrival for the signals shown in FIG. 4 is 90°, and the angle of arrival for the signals shown in FIG. 5 is 81°.

Figure 6:
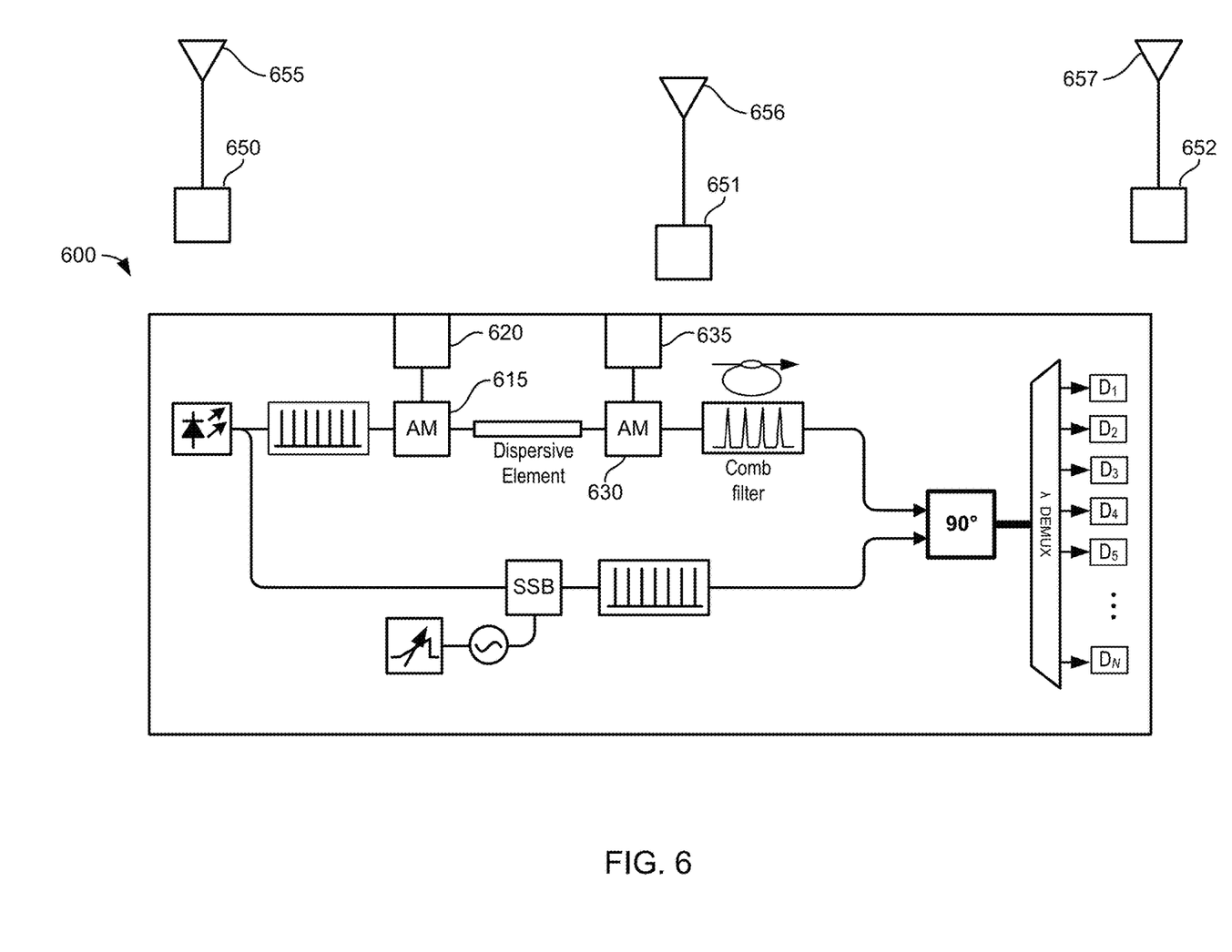
FIG. 6 provides a schematic illustration of an example correlative receiver system in accordance with some examples of the present disclosure.

In some examples, determining a cyclic autocorrelation or spectral correlation function can be achieved using antennas that are remote from a correlation system, in contrast with the configuration in correlation system 200, shown in FIG. 2. For example, FIG. 6 shows a correlation system 600, similar to correlation system 200, which contains other components to enable use of remote antennas. For example, instead of antennas being directly coupled to first optical modulator and second optical modulator, correlation system 600 includes a first input subsystem 620 coupled to first optical modulator 615 and a second input subsystem 635 coupled to second optical modulator 630. Although illustrated as separate subsystems in FIG. 6, input subsystems 620 and 635 can be the same component. Correlation system 600 can include other components beyond those illustrated, such as processors, input or output devices, control devices, memory devices, storage devices, or the like.

Input subsystems 620 and 635 can provide remote modulating signals $x_r(t)$ in place of the modulating signals provided by antennas 220 and 230 in correlation system 200. Here, the remote modulating signals $x_r(t)$ can correspond to antenna signals received at correlation system 600 from a remote antenna system. For example, FIG. 6 shows three remote antenna systems 650, 651, and 652, each respectively including its own antenna, 655, 656, and 657. Remote antenna systems 650, 651, and 652 can include components to obtain, digitize, and transmit received signals at the corresponding antennas as digital data to correlation system 600, where first and second input subsystems 620 and 635 can respectively use the digital data to generate and provide the modulating signals $x_r(t)$ to first and second optical modulators 615 and 630. For example, remote antenna systems 650, 651, and 652 can include amplifiers, analog-to-digital converters, and other components to receive, digitize, and/or process emission signals received at the corresponding antennas and communicate (e.g., over wireless or wireline digital communications) the received signals as digital data to correlation system 600. In some examples, a remote antenna system can include a processor or other component to transform the received and digitized emission signals, such as to determine a Fourier transform of the emission signals and/or to determine a conjugate of an emission signal or a Fourier transform, and/or to compress or encode the digital data. Although three remote antenna systems 650, 651, and 652 are shown in FIG. 6, any desirable number of additional antenna systems can be used. Further, one or more antennas may be directly integrated in correlation system 600, but use of multiple remote antennas may provide various advantages.

For example, by using remote antenna systems, correlation system 600 can obtain cyclic autocorrelation or spectral correlation functions in pairwise manners between any or all pairs of antennas, as desired. In the configuration illustrated in FIG. 6, for example, input subsystem 620 can use the antenna signal from remote antenna system 650 and input subsystem 635 can use the antenna signal from remote antenna system 651. Additionally or alternatively, input subsystem 620 can use the antenna signal from remote antenna system 651 and input subsystem 635 can use the antenna signal from remote antenna system 652. Additionally or alternatively, input subsystem 620 can use the antenna signal from remote antenna system 652 and input subsystem 635 can use the antenna signal from remote antenna system 650. The converse pairs of antenna assignments may also be used. In this way, three pairs of antennas may be used, each to determine an angle of arrival of a received emissions, and using the angles of arrival a precise location of an emitter can be determined.

Tracking Locations of Traffic Participants

Figure 7:
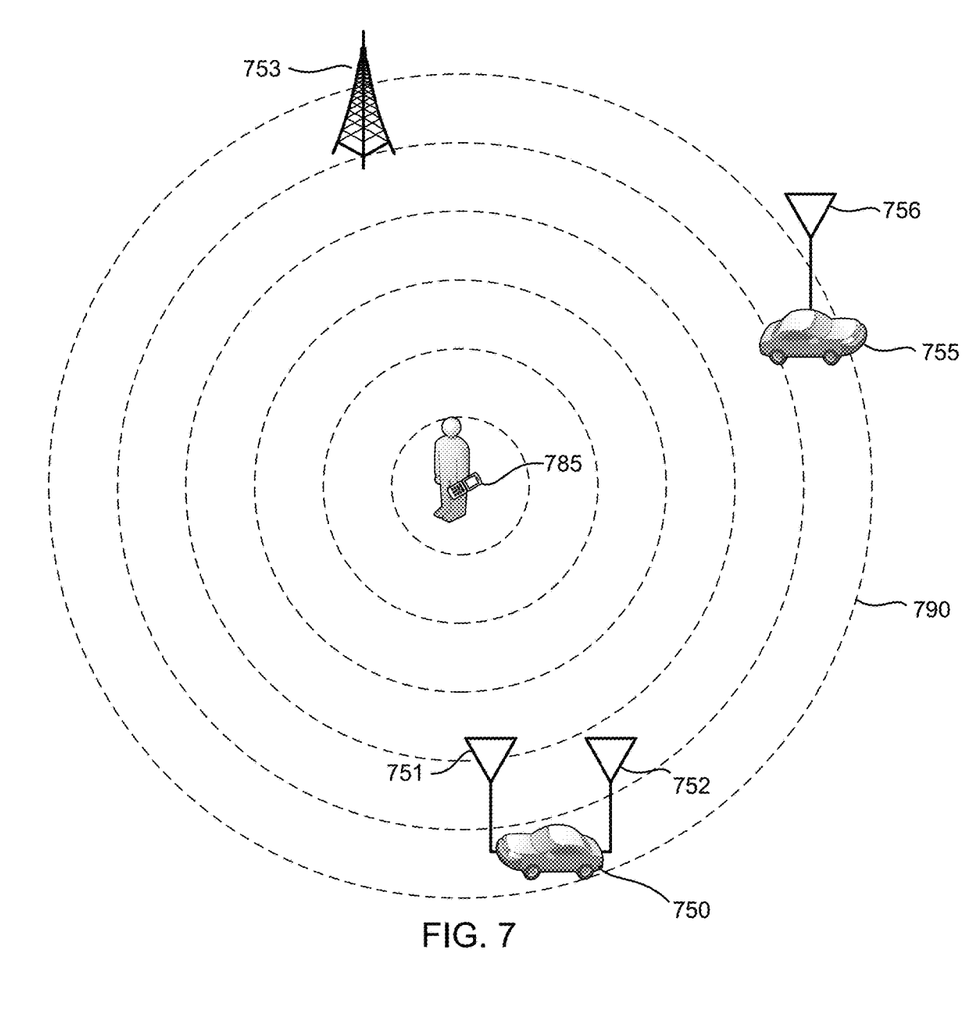
FIG. 7 provides a schematic illustration of a plurality of traffic participants and use of correlative receiver systems in use for determination of geolocations of traffic participants.

FIG. 7 provides a schematic illustration of plurality of traffic participants. Illustrated traffic participants include vehicles 750 and 755 and a pedestrian, carrying a wireless emitter 785 (e.g., a cellular phone) generating radio frequency emissions 790.

In this example, vehicles 750 may comprise a correlation system and include antennas 751 and 752 and vehicle 755 may comprise a remote antenna system and include antenna 756. In some examples, additional or fewer antennas may be provided on vehicles 750 or 755 than illustrated. For example, vehicle 750 may use a pairwise combination of various antennas 751, 752, and 756 to determine angles of arrival to emitter 785 by determining cyclic autocorrelation functions and/or spectral correlation functions and time delays, $t_D$, for the emissions 790. In some examples, an antenna of a fixed antenna system 753 may also be used for pairwise combination and determination of angles of arrival to emitter 785. Using the angles of arrival, the geolocation (e.g., relative geographic coordinates from the antennas) can be determined for the emitter 785.

Although only a single emitter is illustrated in FIG. 7, each of vehicles 750 and 755 and any other traffic participants or other emitters can be present in the region and geolocations for each emitter can be similarly obtained in the same way and using the same pairs of antennas, or different pairs of antennas. In some cases, narrow-band antennas can be used to sensitively monitor a subset of the radio frequency spectrum, but mixed-signal receivers can also cover very large bands of the radio frequency spectrum, allowing for determining geolocations for large numbers and varieties of emitters. Advantageously, obtaining a cyclic autocorrelation function and/or spectral correlation function using pair-wise antennas as described herein can be used to obtain geolocation for all emitters simultaneously.

It will be appreciated that the antenna systems and correlation systems used for determining geolocation can be located at extremely long distances from the emitters/traffic participants and still be useful for determining geolocation and other information. For example, the signal to noise ratio needed to determine the geolocation of the emitters/traffic participants according to the techniques described herein can be significantly smaller than the signal to noise ratio needed to receive and decode the data transmissions made by the emitters/traffic participants. It is possible to use correlative receivers to determine a location and classification of wireless emitters/traffic participants at distances well outside the typical operational range needed for wireless communication, though in a traffic situation, the range is typically very close. This can be the case since the data in the electromagnetic emission does not need to be recovered by the correlative receiver, effectively reducing the required signal-to-noise ratio, allowing a correlative receiver to be positioned much further away than is needed for a typical base station, which generally establishes a two-way link with wireless emitters and, as a result, is often positioned in reasonable proximity to the wireless emitters. In this way, one or more fixed antenna systems can be positioned proximal from the immediate traffic region of the vehicles of interest, but still provide for useful input signals to a correlative receiver system to allow for determination of geolocation tracking of emitters in the traffic flow. Further, the correlative receivers useful in the systems and methods described herein can provide for high discrimination against noise. For example, cyclic autocorrelation functions and/or spectral correlation functions are able to restrict noise to certain positions because a signal is correlated with itself. In a spectral correlation function, the noise is confined to a specific correlation frequency or cyclic frequency ($\alpha=0$), while modulated signals are able to rise above the detection floor elsewhere and provide a modulation signature. In a cyclic autocorrelation function, the noise is confined to the origin of the specific correlation frequency or cyclic frequency ($\alpha$) and time delay ($\tau$) map.

With geolocation information available for a plurality of emitters/traffic participants, such information can be used in conjunction with other information available to a vehicle (e.g., a self-driving or autonomous vehicle), which can relieve or reduce computational burdens on the vehicle from generating and/or processing short range, computationally intensive signals, like LiDAR signals, or otherwise aid the vehicle in determining the locations of various traffic participants.

In some examples, some traffic participants may not include wireless emitters, but the systems, methods, and techniques described herein can still be useful for determining geolocation information for at least some of these traffic participants. For example, a correlative receiver or antenna system can generate a wireless emission that is intended to reflect at least partly off the traffic participant and then switch to a receiving mode where the reflected emission is monitored for in the same way that active emissions are analyzed herein. In some cases, the prospective wireless emission can intentional include particular emission characteristics, such as frequency, bandwidth, modulation type, or the like, to provide facile discrimination against other wireless emissions or noise, though this is only optional, as the systems and methods described herein are able to powerfully discriminate against noise or other emissions due to the cross-correlative aspects of the receiver.

In some cases, the geolocations of any traffic participants can be overlaid on a map, coordinate system, or other user interface, such as to visualize the distribution of emitter locations. Additional information about each emitter can be determined by further examining the cyclic autocorrelation functions and/or spectral correlation functions obtained for determining the geolocations of emitters. For example, the positions and numbers of features in a cyclic autocorrelation function and/or spectral correlation function can provide a physical signature indicating details regarding the emitter, as different types of wireless emitters will emit with different physical characteristics, such as emission frequency and operating band, modulation cycle, coding type used to modulate the emission, spectral and temporal response of the transmitter generating the emission, etc., and this may also vary based on the wireless service being used, based on the hardware type comprising the specific emitter, or based on the wireless service provider's configuration. For example, using known wireless emitter capabilities, specific information about an individual wireless emitter can be determined by detecting the physical electromagnetic emissions, again without decoding or decrypting the content. This can be achieved by analyzing amplitudes or phases of features in a cyclic autocorrelation function and/or spectral correlation function, and/or using a pattern matching function for known signatures. Additional details regarding techniques for analyzing signals using correlative receivers are described in U.S. patent application Ser. No. 17/681,629, which is hereby incorporated by reference in its entirety. In some cases, a database of known emitter types can be used to match physical signature information with the type, class, manufacturer, and or model of an emitter. In some examples, the type or class of emitter can be paired with or overlaid on a map or other coordinate system to show the distribution of emitter locations and their types or classes. This information can be provided as icon information for an emitter or in a configuration where expanded details about a particular emitter can be expanded, such as when the map or coordinate system is displayed on a graphical user interface.

Figure 8:
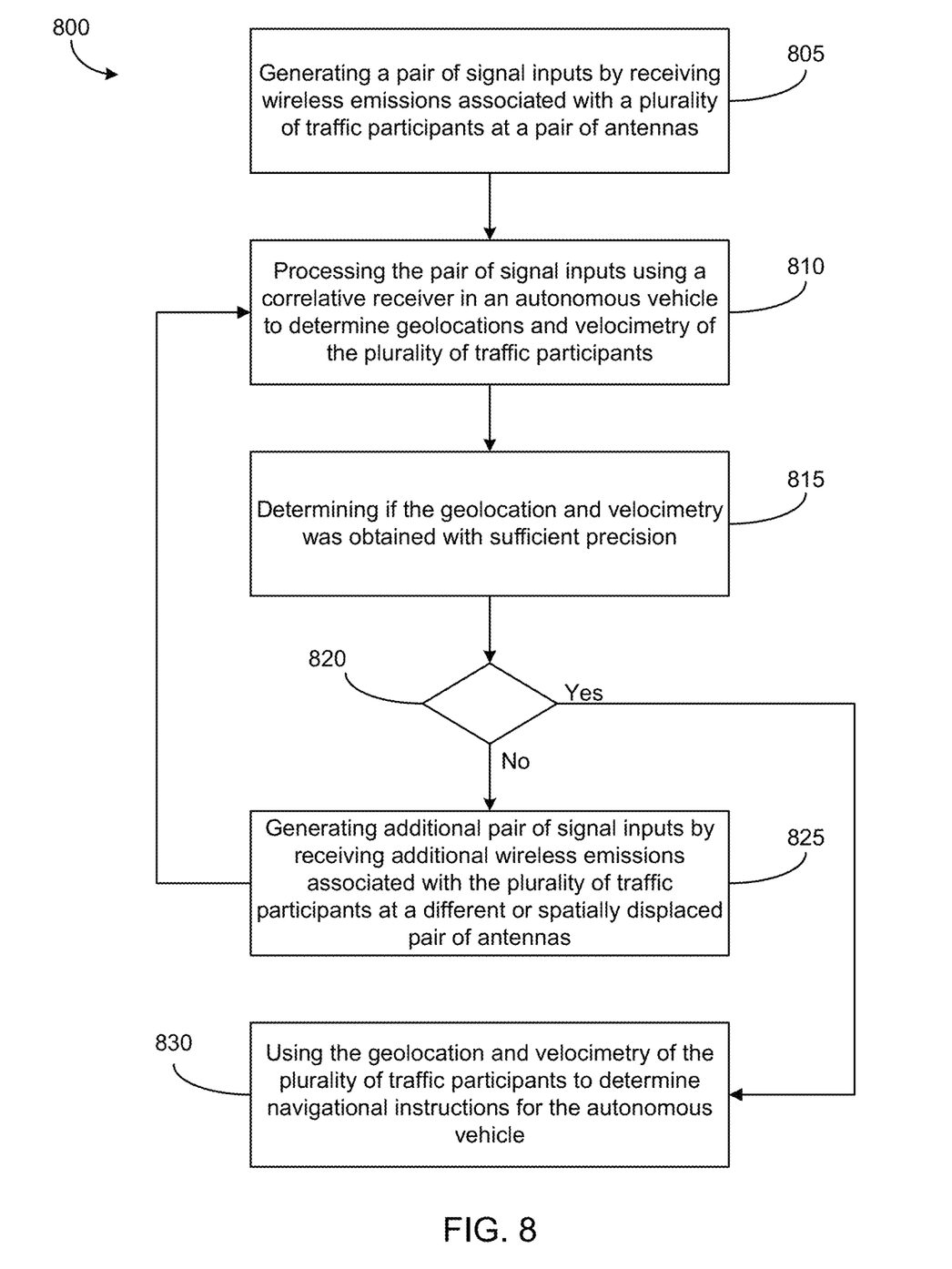
FIG. 8 provides a simplified flowchart detailing method of determining traffic participant locations and/or velocimetry, in accordance with some examples of the present disclosure.

FIG. 8 is a simplified flowchart illustrating a method 800 of determining traffic participant locations and/or velocimetry according to an example, such as by an autonomous vehicle for use in determining navigational instructions. At block 805 a pair of signal inputs is generated by receiving wireless emissions associated with a plurality of traffic participants at a pair of antennas. The distance between the antennas in the pair can be known, and the wireless emissions can be received, possibly at different times, at each antenna. For example, each antenna can generate a time dependent modulated voltage signal, which can be provided as input signals to a correlative receiver. The antennas can be positioned in or on the autonomous vehicle, though embodiments are contemplated where the antennas are positioned outside the autonomous vehicle and the signal inputs are transmitted to the autonomous vehicle wirelessly.

At block 810, the pair of signal inputs is processed by a correlative receiver in the autonomous vehicle to determine a set of geolocations, and optionally velocimetry, of the plurality of traffic participants. As a first step of the process, the time dependent voltage signals can be quantized, such as using an analog to digital converter. Optionally, a Fourier transform of the time dependent signals can be carried out to transform the signals into the frequency space. The signals can then be spectrally correlated using an autocorrelation function, which can allow for features to be extracted, such as a time difference of arrival (TDOA) or an angle of arrival (AoA) to be determined, which can then be used to determine the geolocation of the plurality of traffic participants or wireless emitters associated with the traffic participants. Optionally, emission signatures can be determined for the first pair of signal inputs to determine classes or types of the wireless emitters associated with the plurality of traffic participant. For example, the emission signature can identify physical parameters (e.g., frequency capabilities, bitrate capabilities, etc.) of the wireless emitter and the class of service (e.g., service provider) the wireless emitter is using. This information may be coupled with the geolocation.

At block 815, the geolocation and velocimetry information can be evaluated to determine if the geolocation and velocimetry for the traffic participants is obtained with sufficient precision. If no, process 800 can branch at decision point 820 to block 825, where additional signal inputs can be generated by receiving additional wireless emissions associated with the plurality of traffic participants, such as using one or more different antennas or one or more antennas displaced from those used at block 805, which may be naturally the case in the event that the antennas are in or on the autonomous vehicle and the autonomous vehicle is in motion. The process can return to block 810, where the processing can be repeated for the additional signal inputs to determine updated velocimetry and geolocation information for the plurality of traffic participants. Optionally, accelerations, predicted paths, predicted positions, or predicted velocities may also be determined using the additional signals and processing.

If the geolocation and velocimetry information is determined at block 815 as being obtained with sufficient precision, process 800 can branch at decision point 820 to block 830, where the geolocations and velocimetry information can be provided to an autonomous vehicle. The process can occur within the autonomous vehicle, such that the information can be used by the autonomous vehicle itself to determine navigational instructions. In some cases, the geolocations and velocimetry information can be wirelessly communicated to other autonomous vehicles. In some cases, additional geolocations and velocimetry information can also be received from other autonomous vehicles and used together with the geolocations and velocimetry information determined by the autonomous vehicle to determine the navigational instructions.

Figure 9:
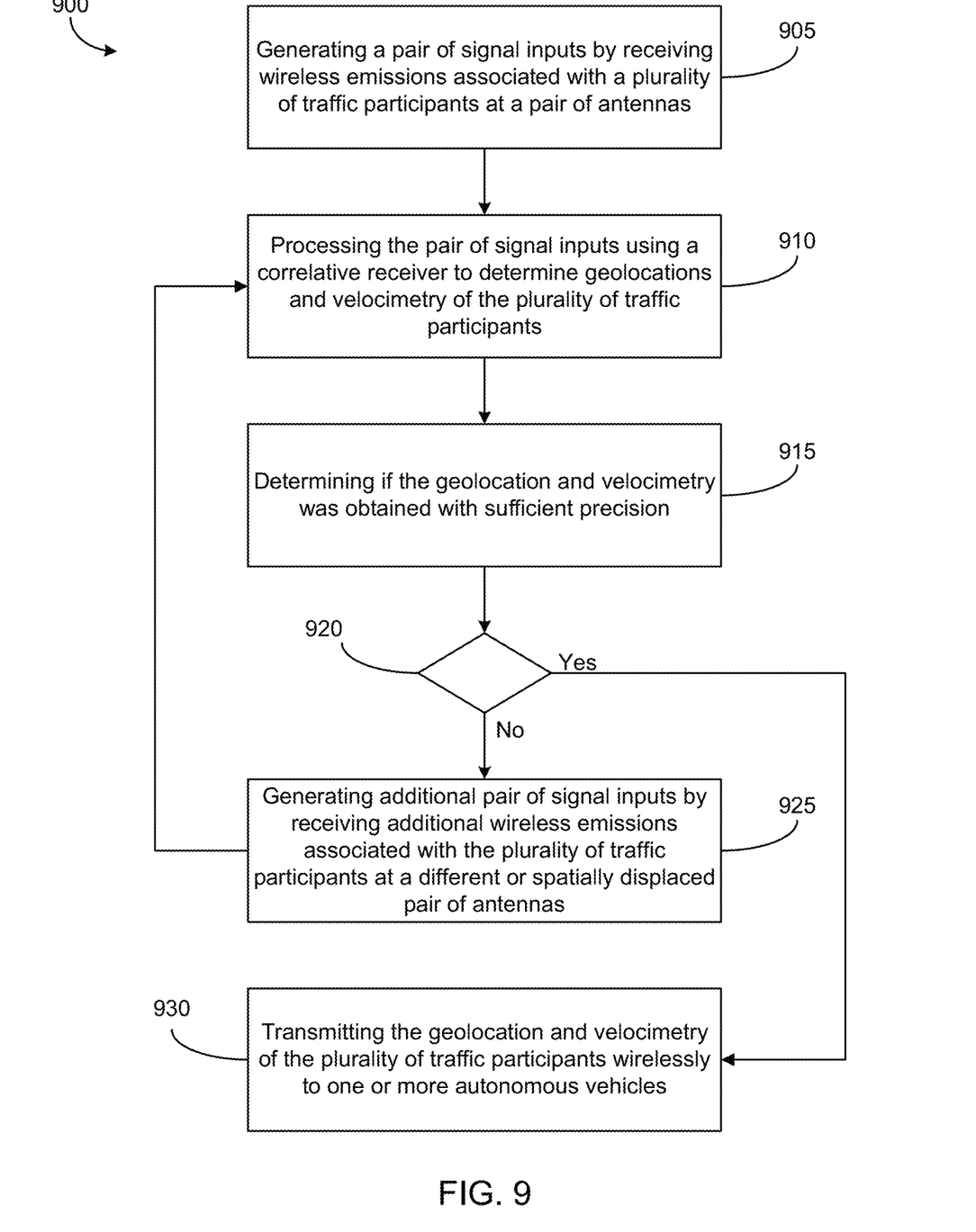
FIG. 9 provides a simplified flowchart detailing method of determining traffic participant locations and/or velocimetry, in accordance with some examples of the present disclosure.

FIG. 9 is a simplified flowchart illustrating a method 900 of determining traffic participant locations and/or velocimetry according to an example. At block 905 a pair of signal inputs is generated by receiving wireless emissions associated with a plurality of traffic participants at a pair of antennas, such as antennas that are positioned outside a particular autonomous vehicle for which navigational instructions are to be determined. The distance between the antennas in the pair can be known, and the wireless emissions can be received, possibly at different times, at each antenna. For example, each antenna can generate a time dependent modulated voltage signal, which can be provided as input signals to a correlative receiver.

At block 910, the pair of signal inputs is processed by the correlative receiver to determine a set of geolocations, and optionally velocimetry, of the plurality of traffic participants. The correlative receiver may be positioned outside a particular autonomous vehicle for which navigational instructions are to be determined, such as a particular autonomous vehicle that is a traffic participant of the plurality of traffic participants. As a first step of the process, the time dependent voltage signals can be quantized, such as using an analog to digital converter. Optionally, a Fourier transform of the time dependent signals can be carried out to transform the signals into the frequency space. The signals can then be spectrally correlated using an autocorrelation function, which can allow for features to be extracted, such as a time difference of arrival (TDOA) or an angle of arrival (AoA) to be determined, which can then be used to determine the geolocation of the plurality of traffic participants or wireless emitters associated with the traffic participants. Optionally, emission signatures can be determined for the first pair of signal inputs to determine classes or types of the wireless emitters associated with the plurality of traffic participant. For example, the emission signature can identify physical parameters (e.g., frequency capabilities, bitrate capabilities, etc.) of the wireless emitter and the class of service (e.g., service provider) the wireless emitter is using. This information may be coupled with the geolocation.

At block 915, the geolocation and velocimetry information can be evaluated to determine if the geolocation and velocimetry for the traffic participants is obtained with sufficient precision. If no, process 900 can branch at decision point 920 to block 925, where additional signal inputs can be generated by receiving additional wireless emissions associated with the plurality of traffic participants, such as using one or more different antennas or one or more antennas displaced from those used at block 905. The process can return to block 910, where the processing can be repeated for the additional signal inputs to determine updated velocimetry and geolocation information for the plurality of traffic participants. Optionally, accelerations, predicted paths, predicted positions, or predicted velocities may also be determined using the additional signals and processing.

If the geolocation and velocimetry information is determined at block 915 as being obtained with sufficient precision, process 900 can branch at decision point 920 to block 930, where the geolocations and velocimetry information can be provided to an autonomous vehicle, such as via wireless data communication. Optionally, the pair of antennas and/or the correlative receiver can be located at a fixed position outside the particular autonomous vehicle. Optionally, the pair of antennas and/or the correlative receiver can be located in another autonomous vehicle, such as another autonomous vehicle that is a traffic participant of the plurality of traffic participants.

The processes of generating signals by receiving wireless emissions and processing can be used to simultaneously determine geolocation for as many traffic participants as are in the detection range of the antennas. Similarly, the process of generating signals by receiving wireless emissions and processing to determine geolocation can be repeated as a function of time for the wireless emitters to allow tracking geolocation of the wireless emitters over time. Advantageously, the continued tracking of geolocation, coupled with the corresponding class or type of wireless emitter, can allow an individual wireless emitter to be accurately tracked and positions predicted. The geolocation information, type or class information, velocimetry information, etc., can be optionally provided as a data stream to one or more other traffic participants.

It should be appreciated that the specific steps illustrated in FIG. 8 and FIG. 9 provide particular methods of determining geolocations of traffic participants according to some examples. Other sequences of steps may also be performed according to alternative embodiments. For example, alternative embodiments may perform the steps outlined above in a different order. Moreover, the individual steps illustrated in FIG. 8 and FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method of determining traffic participant locations and velocimetry information by an autonomous vehicle, the method comprising:
   obtaining a set of signal inputs corresponding to wireless emissions associated with a plurality of traffic participants received at three or more antennas;
   processing the set of signal inputs to determine a plurality of cyclic autocorrelation functions or spectral correlation functions for a plurality of pairs of signal inputs of the set of signal inputs using a correlative receiver;
   determining a set of geolocations and/or velocimetry information for the plurality of traffic participants using the cyclic autocorrelation functions or the spectral correlation functions; and
   using the set of geolocations and/or velocimetry information by a data processor in an autonomous vehicle to determine navigational instructions for the autonomous vehicle.

2. The method of claim 1, further comprising repeating the obtaining and the processing one or more times and determining additional or more precise geolocations and velocimetry information for the plurality of traffic participants.

3. The method of claim 1, wherein processing the set of signal inputs comprises:
   processing multiple pairs of signal inputs from different pairs of the three or more antennas, using the correlative receiver, to determine a set of time delays associated with receiving the wireless emissions at the three or more antennas;
   determining a set of angles of arrival of the wireless emissions at the three or more antennas using the set of time delays; and
   determining the set of geolocations of the plurality of traffic participants using the set of angles of arrival.

4. The method of claim 1, wherein a wireless emission associated with a traffic participant comprises a wireless emission generated by a wireless emitter in the traffic participant.

5. The method of claim 1, wherein a traffic participant of the plurality of traffic participants comprises a vehicle or a pedestrian.

6. The method of claim 1, wherein a wireless emission associated with a traffic participant comprises a wireless emission reflected by the traffic participant.

7. The method of claim 1, further comprising generating a new wireless emission and directing the new wireless emission toward the plurality of traffic participants, wherein the wireless emissions comprise a reflection of the new wireless emission from at least one traffic participant.

8. The method of claim 1, further comprising analyzing one or more of the cyclic autocorrelation functions or spectral correlation functions to identify a set of classes or types of emitters associated with the plurality of traffic participants.

9. The method of claim 1, further comprising providing the set of geolocations and the velocimetry information to another autonomous vehicle corresponding to a traffic participant of the plurality of traffic participants.

10. The method of claim 1, wherein the correlative receiver is a component of the autonomous vehicle, the autonomous vehicle corresponding to a traffic participant of the plurality of traffic participants.

11. The method of claim 1, wherein the correlative receiver is remote from the plurality of traffic participants and wherein the method further comprises:
   transmitting the set of geolocations and velocimetry information wirelessly to the autonomous vehicle for use in determining or applying the navigational instructions for the autonomous vehicle.

12. A system for determining traffic participant locations and velocimetry information, the system comprising:
   three or more antennas;
   a correlative receiver positioned in data communication with the three or more antennas, wherein the correlative receiver is configured to process a set of signal inputs corresponding to wireless emissions associated with a plurality of traffic participants received at the three or more antennas to determine a plurality of cyclic autocorrelation functions or spectral correlation functions for a plurality of pairs of signal inputs of the set of signal inputs; and
   one or more processors configured to:
      determine a set of geolocations and/or velocimetry information for the plurality of traffic participants using the cyclic autocorrelation functions or the spectral correlation functions; and
      use the set of geolocations and/or velocimetry information to determine navigational instructions for an autonomous vehicle.

13. The system of claim 12, wherein: the correlative receiver is further configured to repeat one or more times:
  obtaining a new set of signal inputs corresponding to wireless emissions associated with the plurality of traffic participants received at the three or more antennas; and
  processing the new set of signal inputs to determine a plurality of new cyclic autocorrelation functions or spectral correlation functions for a plurality of pairs of signal inputs of the new set of signal inputs; and
the one or more processors are further configured to determine additional or more precise geolocations and velocimetry information for the plurality of traffic participants.

14. The system of claim 12, wherein, to process the set of signal inputs, the correlative receiver is configured to:
  process multiple pairs of signal inputs from different pairs of the three or more antennas to determine a set of time delays associated with receiving the wireless emissions at the three or more antennas;
  determine a set of angles of arrival of the wireless emissions at the three or more antennas using the set of time delays; and
  determine the set of geolocations of the plurality of traffic participants using the set of angles of arrival.

15. The system of claim 12, wherein a wireless emission associated with a traffic participant comprises a wireless emission generated by a wireless emitter in the traffic participant.

16. The system of claim 12, wherein a traffic participant of the plurality of traffic participants comprises a vehicle or a pedestrian.

17. The system of claim 12, wherein a wireless emission associated with a traffic participant comprises a wireless emission reflected by the traffic participant.

18. The system of claim 12, wherein the one or more processors are further configured to analyze one or more of the cyclic autocorrelation functions or spectral correlation functions to identify a set of classes or types of emitters associated with the plurality of traffic participants.

19. The system of claim 12, wherein the one or more processors are further configured to provide the set of geolocations and the velocimetry information to one or more other autonomous vehicles corresponding to traffic participants of the plurality of traffic participants.

20. The system of claim 12, wherein the correlative receiver and the one or more processors are components of the autonomous vehicle.

* * * * *